(12) United States Patent
Meadows

(10) Patent No.: US 10,940,366 B1
(45) Date of Patent: Mar. 9, 2021

(54) SOWABLE GOLF BALL

(71) Applicant: Spencer Meadows, Ballston Spa, NY (US)

(72) Inventor: Spencer Meadows, Ballston Spa, NY (US)

( * ) Notice: Subject to any disclaimer, the term of this patent is extended or adjusted under 35 U.S.C. 154(b) by 0 days.

(21) Appl. No.: 16/785,938

(22) Filed: Feb. 10, 2020

(51) Int. Cl.
*A63B 37/02* (2006.01)
*A63B 37/00* (2006.01)
*A01C 1/04* (2006.01)
*A01M 29/16* (2011.01)
*A01M 29/12* (2011.01)

(52) U.S. Cl.
CPC .......... *A63B 37/0024* (2013.01); *A01C 1/046* (2013.01); *A01M 29/12* (2013.01); *A01M 29/16* (2013.01); *A63B 37/0051* (2013.01)

(58) Field of Classification Search
CPC .......... A63B 37/0024; A63B 37/0051; A01M 29/12; A01M 29/16; A01C 1/046
USPC ....... 473/354, 356, 358, 364, 367, 368, 369, 473/375
See application file for complete search history.

(56) References Cited

U.S. PATENT DOCUMENTS

| | | | | |
|---|---|---|---|---|
| 5,022,182 A | * | 6/1991 | Anderson | A01G 24/00 47/48.5 |
| 5,447,314 A | * | 9/1995 | Yamazaki | A63B 24/0021 473/353 |
| 2002/0094885 A1 | * | 7/2002 | Finkel | A63B 43/00 473/351 |
| 2006/0205534 A1 | * | 9/2006 | Egashira | A63B 37/0003 473/351 |
| 2009/0082137 A1 | * | 3/2009 | Okabe | A63B 37/0003 473/385 |
| 2010/0087273 A1 | * | 4/2010 | Matthews | A63B 37/0022 473/353 |
| 2015/0104234 A1 | * | 4/2015 | Falken | B43K 29/00 401/96 |
| 2015/0273275 A1 | * | 10/2015 | Blink | A63B 37/0024 473/372 |
| 2018/0279607 A1 | * | 10/2018 | Guerret | A01M 29/12 |
| 2019/0223426 A1 | * | 7/2019 | Macadar Angier | A01M 29/12 |
| 2020/0060101 A1 | * | 2/2020 | Wylie | A01C 1/046 |

FOREIGN PATENT DOCUMENTS

| | | | | | |
|---|---|---|---|---|---|
| JP | 04-049984 | * | 4/1992 | ............. | A63B 37/00 |
| JP | H04-049984 | * | 4/1992 | ............. | A63B 37/00 |

* cited by examiner

*Primary Examiner* — John E Simms, Jr.
(74) *Attorney, Agent, or Firm* — Lev Ivan Gabriel Iwashko; The Iwashko Law Firm, PLLC

(57) ABSTRACT

A sowable golf ball, including a biodegradable shell to protect an interior thereof, a rubber winding disposed within at least a portion of the biodegradable shell to facilitate bouncing on an object or a surface by the biodegradable shell, and a seed compartment disposed within at least a portion of the rubber winding to store a plurality of seeds therein.

6 Claims, 2 Drawing Sheets

SOWABLE GOLF BALL

BACKGROUND

1. Field

The present general inventive concept relates generally to a golf ball, and particularly, to a sowable golf ball.

2. Description of the Related Art

Golf is a popular sport that attracts a wide variety of players. Golf is often played on courses featuring open fields of grass, water hazards (a.k.a. bodies of water), and trees. During play, a player sometimes hits a golf ball into a water hazard or patches of trees that prevent the player from locating the golf ball. Consequently, the player will just leave the golf ball and get a new one to resume play.

Golf balls are an essential component for both recreational and professional players. However, generally, the golf ball that is lost is not biodegradable. This results in an environmental burden that could greatly affect wildlife and appearance of a golf course from lost balls.

Therefore, there is a need for a golf ball that is biodegradable and sowable to contribute to agriculture on the golf course.

SUMMARY

The present general inventive concept provides a sowable golf ball.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a sowable golf ball, including a biodegradable shell to protect an interior thereof, a rubber winding disposed within at least a portion of the biodegradable shell to facilitate bouncing on an object or a surface by the biodegradable shell, and a seed compartment disposed within at least a portion of the rubber winding to store a plurality of seeds therein.

The biodegradable shell may include a plurality of dimples disposed on at least a portion of the biodegradable shell to reduce drag from air flow over the biodegradable shell.

The biodegradable shell may be at least partially constructed of a biodegradable material.

The biodegradable material may be at least one of cork, desert sand, linoleum, bioplastic, timber, and mycelium.

The sowable golf ball may further include a protection unit disposed within at least a portion of the seed compartment to prevent the plurality of seeds from being eaten by at least one animal, such that the protection unit emits at least one of a sound and a scent.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Sowable Golf Ball 100
Biodegradable Shell 110
Dimples 111
Rubber Winding 120
Seed Compartment 130

Seeds 140

Protection Unit 150

Figure 1:
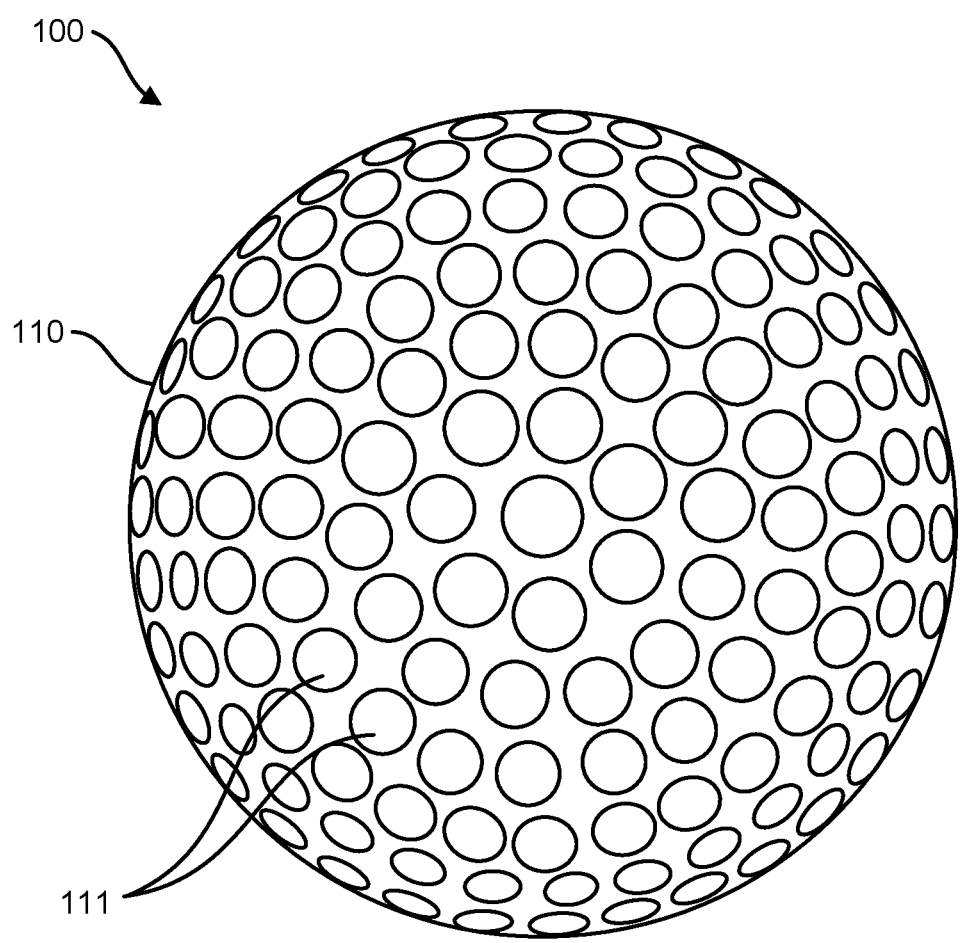
FIG. 1 illustrates a perspective view of a sowable golf ball, according to an exemplary embodiment of the present general inventive concept.

FIG. 1 illustrates a perspective view of a sowable golf ball, according to an exemplary embodiment of the present general inventive concept.

Figure 2:
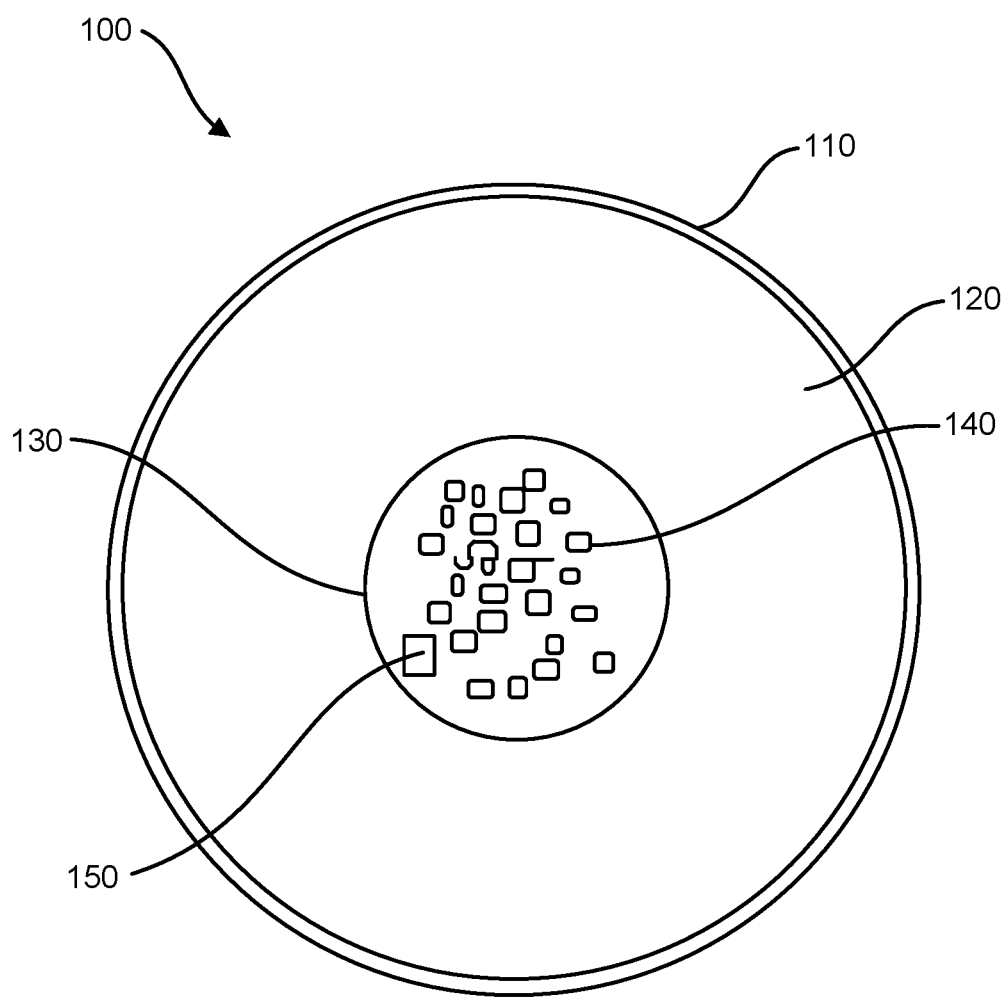
FIG. 2 illustrates a sectional view of the sowable golf ball, according to an exemplary embodiment of the present general inventive concept.

FIG. 2 illustrates a sectional view of the sowable golf ball, according to an exemplary embodiment of the present general inventive concept.

The sowable golf ball 100 may be constructed from at least one of metal, plastic, and rubber, etc., but is not limited thereto. Also, the sowable golf ball 100 may have a generally spherical shape to facilitate rolling. The sowable golf ball 100 may have a predetermined weight. For example, the sowable golf ball 100 may weigh 1.62 grams for professional golfers.

The sowable golf ball 100 may include a biodegradable shell 110, a rubber winding 120, a seed compartment 130, a plurality of seeds 140, and a protection unit 150, but is not limited thereto.

The biodegradable shell 110 may include a plurality of dimples 111, but is not limited thereto.

The biodegradable shell 110 may also be known as an outer surface of the sowable golf ball 100, and may protect an interior thereof. The biodegradable shell 110 may be at least partially constructed of a biodegradable material, such as cork, desert sand, linoleum, bioplastic (e.g., soybeans), timber, and mycelium. As such, the biodegradable shell 110 may decompose after a predetermined period of time, such as two to twelve weeks. Also, the biodegradable shell 110 may be hard to prevent animals from accessing the interior thereof.

Each of the plurality of dimples 111 may be concavely disposed on at least a portion of the biodegradable shell 110. As such, each of the plurality of dimples 111 may be recessed with respect to the biodegradable shell 110.

Additionally, the plurality of dimples 111 may alter motion of the sowable golf ball 100 during movement through the air. In other words, the plurality of dimples 111 may reduce drag from air flow over the biodegradable shell 110 in response to moving through the air, such that the air may flow over a larger portion of the sowable golf ball 100.

The rubber winding 120 may be constructed of hard and/or soft rubber. The rubber winding 120 may have a predetermined thickness and also be biodegradable. In other words, the rubber winding 120 may be at least partially constructed of the biodegradable material discussed above with respect to the biodegradable shell 110.

The rubber winding 120 may be disposed within at least a portion of the biodegradable shell 110. The rubber winding 120 may deform in response to an impact against an object and/or a surface against the biodegradable shell 110. Moreover, the rubber winding 120 may facilitate and/or allow the biodegradable shell 110 to bounce, such that the rubber winding 120 may return to its original shape and cause a springing motion due to the composition of the rubber winding 120. In other words, the rubber winding 120 may bounce and return to its original shape due to being at least partially constructed of rubber, which is known in the art to have an elastic property.

The seed compartment 130 may have a predetermined thickness and is also biodegradable. In other words, the seed compartment 130 may be at least partially constructed of the biodegradable material discussed above with respect to the biodegradable shell 110.

Referring to FIG. 2, the seed compartment 130 may be disposed within at least a portion of the rubber winding 120. Additionally, the seed compartment 130 may have any predetermined size. More specifically, the seed compartment 130 is illustrated to have a predetermined diameter near a center portion of the rubber winding 120. However, the seed compartment 130 may have a larger size based on a preference of a user, such as 95% of a diameter of the rubber winding 120. In other words, the rubber winding 120 may have less width when the seed compartment 130 has a diameter 95% of the size of the rubber winding 120 with respect to the width of the rubber winding 120 when the seed compartment 130 has the diameter as illustrated in FIG. 2.

The plurality of seeds 140 may be stored within the seed compartment 130. The plurality of seeds 140 may also be a singular seed based on the preference of the user. Also, the plurality of seeds 140 may be a type of plant based on the preference of the user and/or a course in which a golf game is played. For example, the plurality of seeds 140 may be pond lily seeds when the user plays golf on a course with multiple water hazards. Alternatively, the plurality of seeds 140 may be seeds for nut trees when the user plays golf on a course with lots of wooded areas, such that the nut tree may grow nuts to feed squirrels, chipmunks, deer, and birds.

The protection unit 150 may include a battery, an audio unit, and/or a scent unit.

The protection unit 150 may be disposed within at least a portion of the seed compartment 130. The protection unit 150 may be connected to at least a portion of the seed compartment 130 to emit a sound and/or a scent to deter at least one animal from eating the plurality of seeds 140. In other words, the protection unit 150 may prevent the plurality of seeds 140 from being eaten by the at least one animal due to the sound and/or the scent being unpleasant for the at least one animal.

Therefore, the sowable golf ball 100 may improve an environment in which it is disposed by allowing the plurality of seeds 140 to stimulate growth of new plants. Additionally, the sowable golf ball 100 may not pollute the environment due to being biodegradable. The sowable golf ball 100 may be enjoyed by amateurs, weekend golfers, or even sponsorship from an eco-friendly professional.

The present general inventive concept may include a sowable golf ball 100, including a biodegradable shell 110 to protect an interior thereof, a rubber winding 120 disposed within at least a portion of the biodegradable shell 110 to facilitate bouncing on an object or a surface by the biodegradable shell 110, and a seed compartment 130 disposed within at least a portion of the rubber winding 120 to store a plurality of seeds 140 therein.

The biodegradable shell 110 may include a plurality of dimples 111 disposed on at least a portion of the biodegradable shell 110 to reduce drag from air flow over the biodegradable shell 110.

The biodegradable shell 110 may be at least partially constructed of a biodegradable material.

The biodegradable material may be at least one of cork, desert sand, linoleum, bioplastic, timber, and mycelium.

The sowable golf ball 100 may further include a protection unit 150 disposed within at least a portion of the seed compartment 130 to prevent the plurality of seeds 140 from being eaten by at least one animal, such that the protection unit 150 emits at least one of a sound and a scent.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A sowable golf ball, comprising:
a biodegradable shell to protect an interior thereof;
a rubber winding disposed within at least a portion of the biodegradable shell to facilitate bouncing on an object or a surface by the biodegradable shell;
a seed compartment having a diameter ninety-five percent of a diameter of the rubber winding disposed within at least a portion of the rubber winding;
a plurality of seeds stored within the seed compartment to stimulate growth of new plants upon being sowed in an environment.

2. The sowable golf ball of claim 1, wherein the biodegradable shell comprises:
a plurality of dimples disposed on at least a portion of the biodegradable shell to reduce drag from air flow over the biodegradable shell.

3. The sowable golf ball of claim 1, wherein the biodegradable shell is at least partially constructed of a biodegradable material.

4. The sowable golf ball of claim 3, wherein the biodegradable material is at least one of cork, desert sand, linoleum, bioplastic, timber, and mycelium.

5. The sowable golf ball of claim 1, further comprising:
a protection unit disposed within at least a portion of the seed compartment to prevent the plurality of seeds from being eaten by at least one animal, such that the protection unit emits at least one of a sound and a scent.

6. A sowable golf ball, comprising:
a biodegradable shell to protect an interior thereof;
a rubber winding disposed within at least a portion of the biodegradable shell to facilitate bouncing on an object or a surface by the biodegradable shell;
a seed compartment disposed within at least a portion of the rubber winding;
a plurality of pond lily seeds stored within the seed compartment to stimulate growth of new plants upon being sowed in a water environment; and
a protection unit disposed within at least a portion of the seed compartment to prevent the plurality of seeds from being eaten by at least one animal, such that the protection unit emits a sound.

* * * * *